United States Patent
Yamamoto (10) Patent No.: US 7,067,996 B2
(45) Date of Patent: Jun. 27, 2006

(54) OPEN-AND-CLOSE CONTROL SYSTEM FOR OPENABLE APPARATUS

(75) Inventor: Motoya Yamamoto, Hamamatsu (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/868,945

(22) Filed: Jun. 17, 2004

(65) Prior Publication Data

US 2004/0257010 A1    Dec. 23, 2004

(30) Foreign Application Priority Data

Jun. 20, 2003    (JP)    ............................. 2003-177191

(51) Int. Cl.
  *H02P 1/54*    (2006.01)
  *H02P 3/00*    (2006.01)
  *H02P 5/46*    (2006.01)
  *H02P 7/68*    (2006.01)
  *H02P 7/74*    (2006.01)

(52) U.S. Cl. ........................ 318/55; 318/280; 318/282; 318/286; 318/445; 318/443; 318/466; 318/468; 49/26; 49/28

(58) Field of Classification Search .................. 318/55, 318/280, 282, 286, 445, 443, 466, 468; 49/26, 49/28
See application file for complete search history.

(56) References Cited

U.S. PATENT DOCUMENTS

| | | | |
|---|---|---|---|
| 4,870,333 A | 9/1989 | Itoh et al. | |
| 5,351,439 A * | 10/1994 | Takeda et al. | ................. 49/28 |
| 5,399,950 A | 3/1995 | Lu et al. | |
| 5,422,551 A * | 6/1995 | Takeda et al. | .............. 318/265 |
| 5,539,290 A | 7/1996 | Lu et al. | |
| 5,689,160 A * | 11/1997 | Shigematsu et al. | ......... 318/281 |
| 5,734,245 A | 3/1998 | Terashima et al. | |
| 6,114,820 A * | 9/2000 | Nishigaya | ................... 318/466 |
| 6,347,482 B1 * | 2/2002 | Takiguchi et al. | ............. 49/28 |
| 6,580,242 B1 * | 6/2003 | Hirose et al. | ............... 318/445 |

FOREIGN PATENT DOCUMENTS

| | | |
|---|---|---|
| JP | U-6-73288 | 10/1994 |
| JP | A-2002-168049 | 6/2002 |
| JP | A-2002-327574 | 11/2002 |

\* cited by examiner

*Primary Examiner*—David Martin
*Assistant Examiner*—Erick Glass
(74) *Attorney, Agent, or Firm*—Posz Law Group, PLC

(57) ABSTRACT

In an automotive power window system, a controller detects positions of a window glass that moves through driving operation of a motor during the closing operation of a window. The controller reduces a rotation speed of the motor when the window glass reaches a speed altering position. It calculates the amount of reduction in the rotation speed produced by the rotation speed reducing operation. Then, it corrects a rotation speed obtained during the closing operation by compensating for the amount of reduction. It determines whether an obstruction for the closing operation is present based on the corrected rotation speed. If the obstruction is detected, it controls the motor for releasing the obstruction.

18 Claims, 5 Drawing Sheets

OPEN-AND-CLOSE CONTROL SYSTEM FOR OPENABLE APPARATUS

CROSS REFERENCE TO RELATED APPLICATION

This application is based on and incorporates herein by reference Japanese Patent Application No. 2003-177191 filed on Jun. 20, 2003.

FIELD OF THE INVENTION

The present invention relates to an open-and-close control system for an openable apparatus including an automotive power window system and an automotive sunroof system.

BACKGROUND OF THE INVENTION

An automotive power window system, proposed in JP-A-2002-168049 or U.S. Pat. No. 5,734,245 (JP-A-8-165842), has a function of preventing an object from being caught between a window glass and a window frame. In such a system, a window closing speed is reduced from a normal speed to a low speed when the window glass reaches a position adjacent to a closed position. As a result, only a small load is applied to the object in the event that the object is caught between the window glass and the window frame.

To detect an object that is an obstruction to window closing operation, a variation in a rotation speed of a motor is calculated when the rotation speed is reduced. Presence of an obstruction is determined when the variation is larger than a predetermined threshold. When an obstruction is present, the rotation speed is reduced and a large variation in the rotation speed is produced. Namely, the presence of the obstruction can be determined by comparing the variation with the threshold.

The variation transitorily becomes large immediately after the rotation speed of the motor is reduced from the normal speed to the low speed. Then, the variation becomes small and the rotation speed becomes stable after a while. The transitory large variation in the rotation speed looks as if the variation is caused by the obstruction. Thus, erroneous determination of presence of an obstruction may be made.

To solve this problem, the obstruction determination is halted for a predetermined period until the rotation speed becomes stable after the reduction of the rotation speed. However, an obstruction can not be detected during this period even it is present. If the obstruction is not successfully detected, it may not be released within a short time.

SUMMARY OF THE INVENTION

The present invention therefore has an objective to provide an open-and-close control system that performs accurate obstruction detection. An open-and-close control system of the present invention for an openable apparatus includes a drive motor section, an opening-and-closing operation command section, a drive motor control section, a rotation speed detection section, a rotation speed alteration section, and an obstruction release control section.

The motor section includes a drive motor for opening and closing an openable apparatus. The open-and-close operation command section outputs a signal for opening or closing operation of the openable apparatus. The motor control section controls the motor for opening or closing the openable apparatus based on the opening or the closing operation command signal. The rotation speed detection section detects a rotation speed of the motor. The rotation speed alteration section alters the rotation speed of the motor. It alters the rotation speed from a normal speed to a low speed during the closing operation.

The obstruction release control section performs obstruction detection during the closing operation. It corrects a value related to the rotation speed during the closing operation by compensating for the amount of reduction in the rotation speed produced by rotation speed reducing operation of the rotation speed alteration section. Then, it performs the obstruction determination based on the corrected value. It controls the motor for releasing the obstruction according to determination of the presence of the obstruction.

For example, it corrects the rotation speed by compensating for the amount of reduction in the rotation speed produced by rotation speed reducing operation. Then, it performs the obstruction determination based on the corrected rotation speed. The amount of reduction in the rotation speed is not reflected in the rotation speed used for the obstruction determination in this example. A decrease in the rotation speed caused by an obstruction is mainly reflected in the rotation speed. Thus, the obstruction determination is accurately performed.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

[First Embodiment]

Figure 1:
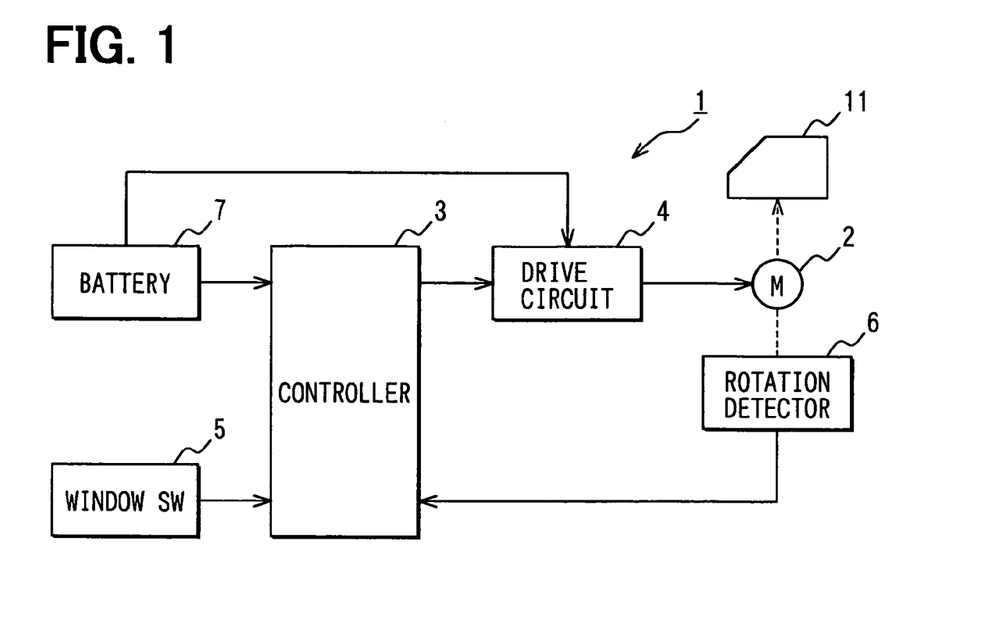
FIG. 1 is a block diagram of an automotive power window system according to embodiments of the present invention.

Referring to FIG. 1, an automotive power window system 1 includes a drive motor 2, a controller 3, a drive circuit 4, a window switch (SW) 5, and a rotation detector 6 that are located at predetermined potions of a vehicle, respectively. The power window system 1 performs opening and closing operations of a window by moving a window glass 11 installed in a side door 10 of a vehicle shown in FIG. 2. The motor 2 moves the window glass 11 up and down via a window regulator (not shown) for opening and closing the window.

The controller 3 performs drive motor control, rotation speed detection, position detection, rotation speed alteration, and obstruction release control. It perfumes the rotation speed detection and the position detection together with the rotation detector 6. Power required for the controller 3 to operate is supplied from an onboard battery 7. The drive circuit 4 feeds power required for the motor 2 to operate from the battery 7 to the motor 2. The window SW 5 functions as an opening-and-closing operation command member that outputs a command signal for opening or closing operation of the window. The rotation detector 6 is integrally arranged with the motor 2.

The rotation detector 6 generates pulse signals that are synchronized with rotations of the motor 2 and outputs the pulse signals to the controller 3. It is configured with two Hall elements so that the pulse signal of one of the elements has a predetermined phase difference with respect to the pulse signal of the other element.

The controller 3 detects a rotation speed (rotation cycle) of the motor 2 based on periods of inputted pulse signals. It also detects a rotation direction of the motor 2 based on a phase difference between the pulse signals of the Hall elements. Namely, the controller 3 detects a moving speed and a moving direction of the window glass 11 based on the rotation speed and the rotation direction of the motor 2, respectively.

The controller 3 performs counting based on edges of the pulse signals and detects positions of the window glass 11 based on the count. Positions P1, P2, P3, and P4 shown in FIG. 2 indicate a closed position, an immediate position, a speed altering position, and an open position, respectively. When the window glass 11 is at the closed position P1, the window is completely closed. When the window glass 11 is at the open position P4, the window is completely open. The speed altering position P3 is predetermined for altering the moving seed of the window glass 11 from a normal speed to a low speed during the closing operation. The immediate position P2 is also predetermined adjacent to the closed position P1 for altering the moving speed back to the normal speed.

Figure 2:
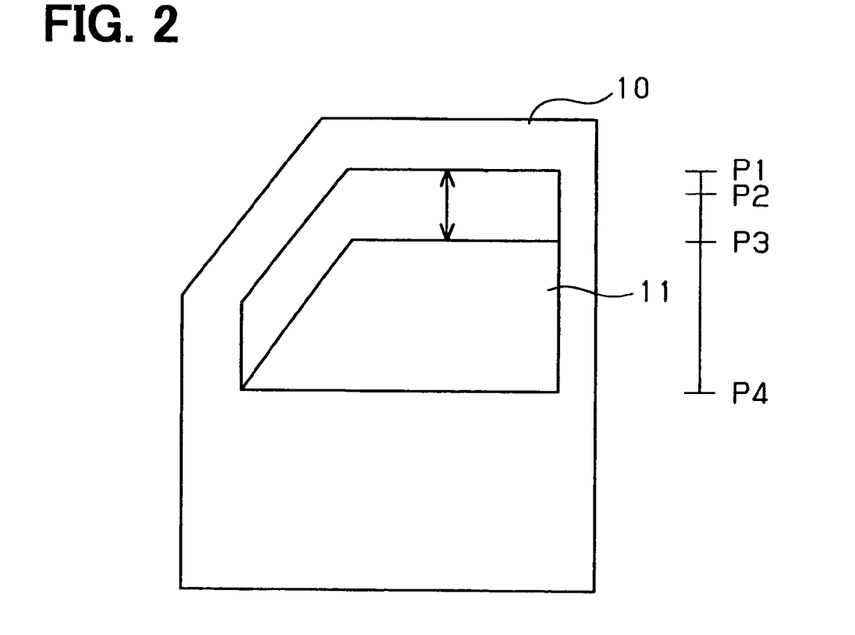
FIG. 2 is an explanatory diagram of a window glass showing positions of the window glass according to the first embodiment.

The first position P1 is initially set at the count of 0 and the count is incremented as the window glass 11 moves toward the open position. The count is decremented during the closing operation of the window glass 11. When the window glass 11 reaches the closed position P1, the count becomes 0.

The controller 3 receives various kinds of command signals from the window switch 5 for moving the window glass 11. The window switch 5 is provided so that a user can open and close the window by moving the window glass 11 through operation of the window switch 5. The window switch 5 includes open, close, and auto switches. It has two ends operable in two steps for moving the window glass 11 in different modes.

When the first step of the first end of the window switch 5 is performed, the open switch is turned on. The window switch 5 outputs a normal opening operation command signal to the controller 3. The window glass 11 continues moving toward the open position P4 until the user stops operating the window switch 5. This is a normal opening operation mode.

When the second step of the first end is performed, the open switch and the auto switch are turned on. The window switch 5 outputs an automatic opening operation command signal to the controller 3. The window glass 11 automatically moves to the open position P4 even when the user stops operating the window switch 5. This is an automatic opening operation mode.

When the first step of the second end is performed, the close switch is turned on. The window switch 5 outputs a normal closing operation command signal to the controller 3. The window glass 11 continues moving toward the closed position P1 until the user stops operating the window switch 5. This is a normal closing operation mode.

When the second step of the second end is performed, the close switch and the auto switch are turned on. The window switch 5 outputs an automatic closing operation command signal to the controller 3. The window glass 11 automatically moves to the closed position P1 even when the user stops operating the window switch 5. This is an automatic closing operation mode.

When the normal opening operation command signal is inputted, the controller 3 drives the motor 2 via the drive circuit for moving the window glass 11 in the normal opening operation mode. The controller 3 continues driving the motor 2 until the user stops operating the window switch 5, that is, while the command signal is being inputted. Likewise, when the normal closing operation command signal is inputted, the controller 3 drive the motor 2 for moving the window glass 11 in the normal closing operation mode.

When the automatic opening operation command signal is inputted, the controller 3 drives the motor 2 via the drive circuit 4 for moving the window glass 11 in the automatic opening operation mode. The window glass 4 is automatically moved to the open position P4. Likewise, when the automatic closing operation command signal is inputted, the controller 3 drives the drive motor 2 for moving the window glass 11 in the automatic closing operation mode. The window glass 4 is automatically moved to the closed position P1.

The controller 3 performs obstruction detection during the closing operation in both the normal mode and the automatic mode. In the obstruction detection, the controller 3 determines whether an obstruction is present between the window glass 11 and a window frame of a side door 10. If the obstruction is present, the moving speed of the window glass 11, that is, a rotation speed of the drive motor 2 decreases. A length of the rotation cycle increases as the rotation speed decreases.

The controller 3 continuously monitors variations in the rotation speed. It determines that an obstruction is present when the amount of reduction in the rotation speed exceeds a predetermined threshold. Then, it controls the motor 2 for releasing the obstruction caught between the window glass 11 and the window frame. More specifically, the controller 3 drives the motor 2 to rotate in the opposite direction for moving the window glass 11 by a predetermined amount toward the open position P4. Alternatively, the controller 3 stops the drive motor 2 for terminating the closing operation so that the window glass 11 will not further move to the closed position P1.

The controller 3 is programmed to recognize the closed position P1, the immediate position P2, the speed altering position P3, and the open position P4. The controller 3 alters the rotation speed of the motor 2 from a normal speed to a low speed when the window glass 11 reaches the speed altering position P3 during the closing operation. The window glass 11 moves at the low speed from the speed altering position P3 to the immediate position P2.

The controller 3 controls the rotation speed of the motor 2 by duty control, or pulse width modulation (PWM) control. The duty ratio of power for driving the motor 2 is set at 100% during the opening operation. The duty ratio also is set at 100% during moving the window glass 11 from the open position P4 to the speed altering potion P3, and from the immediate position P2 to the closed position P1. Direct current power is supplied to the motor 2 for driving the motor 2 at a normal speed.

The duty ratio is set at 70% during moving the window glass 11 from the speed altering position P3 to the immediate position P2. Power having the duty ratio of 70% is supplied to the motor 2 for rotating the motor 2 at a low speed so that the moving speed of the window glass 11 becomes low. This operation reduces a load applied to an obstruction even when it is present. Moreover, the low-speed operation near the closed position P1 provides sophisticated movement of the window glass 11.

When the window glass 11 passes the speed altering position P3 during the closing operation, the controller 3 performs rotation speed reducing operation so that the rotation speed of the motor 2 is reduced. As a result, the amount of reduction in the rotation speed transitory increases immediately after the rotation speed of the motor 2 is reduced. This increase looks similar to the amount of reduction in the rotation speed produced by an obstruction. Thus, the presence of the obstruction may be erroneously determined.

The controller 3 performs a process for reducing such erroneous obstruction determination at predetermined intervals. Because obstruction occurs only during the closing operation, the controller 3 performs the process only during the closing operation. The obstruction detection process including the process for reducing erroneous determination will be discussed in detail referring to FIGS. 3 and 4.

Figure 4:
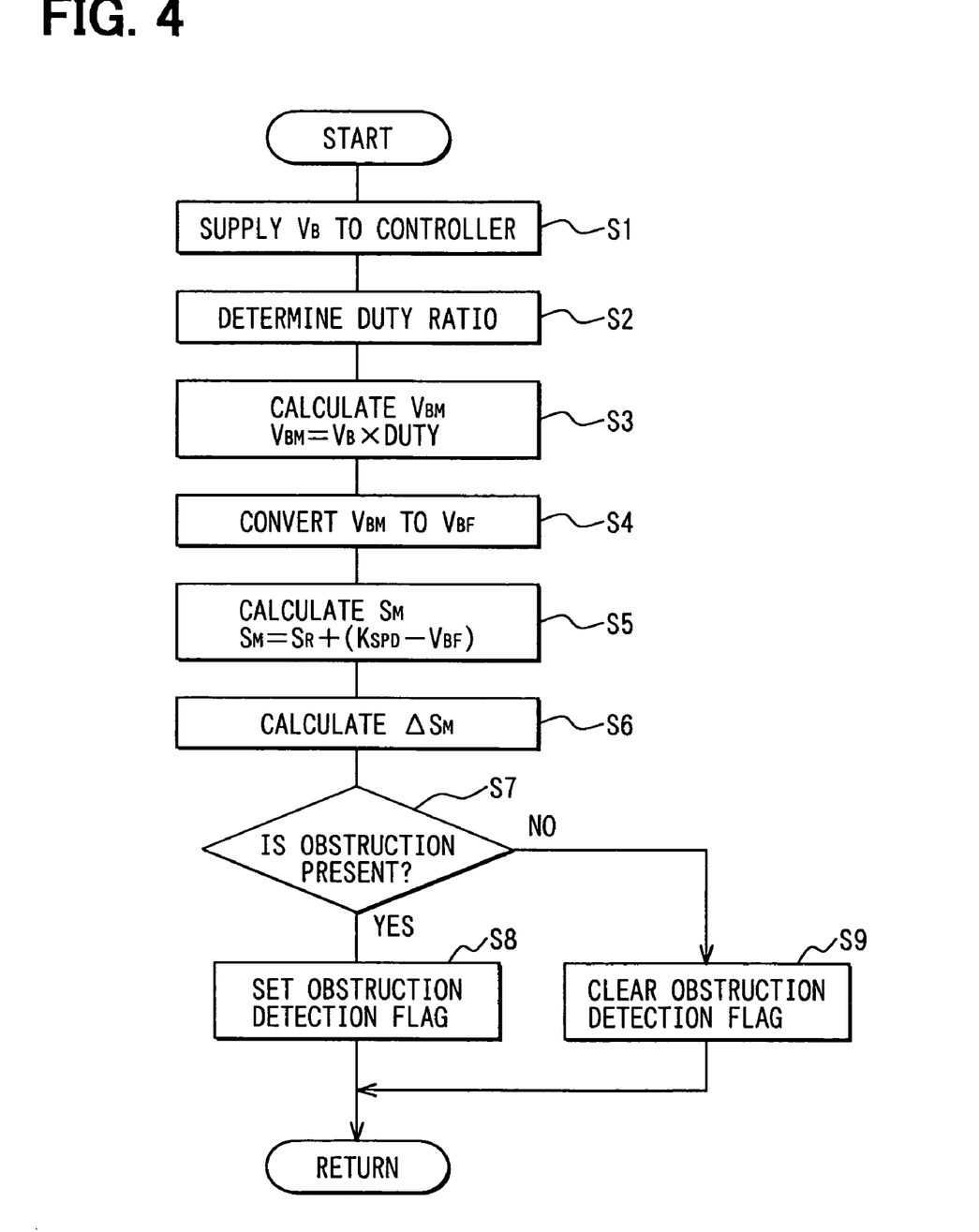
FIG. 4 is a flowchart of an obstruction determination process according to the first embodiment.

A battery voltage $V_B$, which is 14V, is supplied to the controller 3 by the battery 7 (S1). The controller 3 determines the duty ratio based on a position of the window glass 11 (S2). It performs control for supplying power with the duty ratio of 100% to the motor 2 when the position is between the open position P4 and the speed altering position P3, or the immediate position and the closed position P1. The motor 2 operates at the normal speed. When the position is between the speed altering position P3 and the immediate position P2, the controller 3 performs control for supplying power with the duty ratio of 70% to the motor 2. In this case, the motor 2 operates at the low speed.

The controller 3 multiplies the battery voltage $V_B$ by the duty ratio to calculate a motor driving voltage $V_{BM}$ (S3). When the duty ratio is 100%, the motor driving voltage $V_{BM}$ is 14V. When the duty ratio is 70%, the motor driving voltage $V_{BM}$ is 9.8V.

Figure 3:
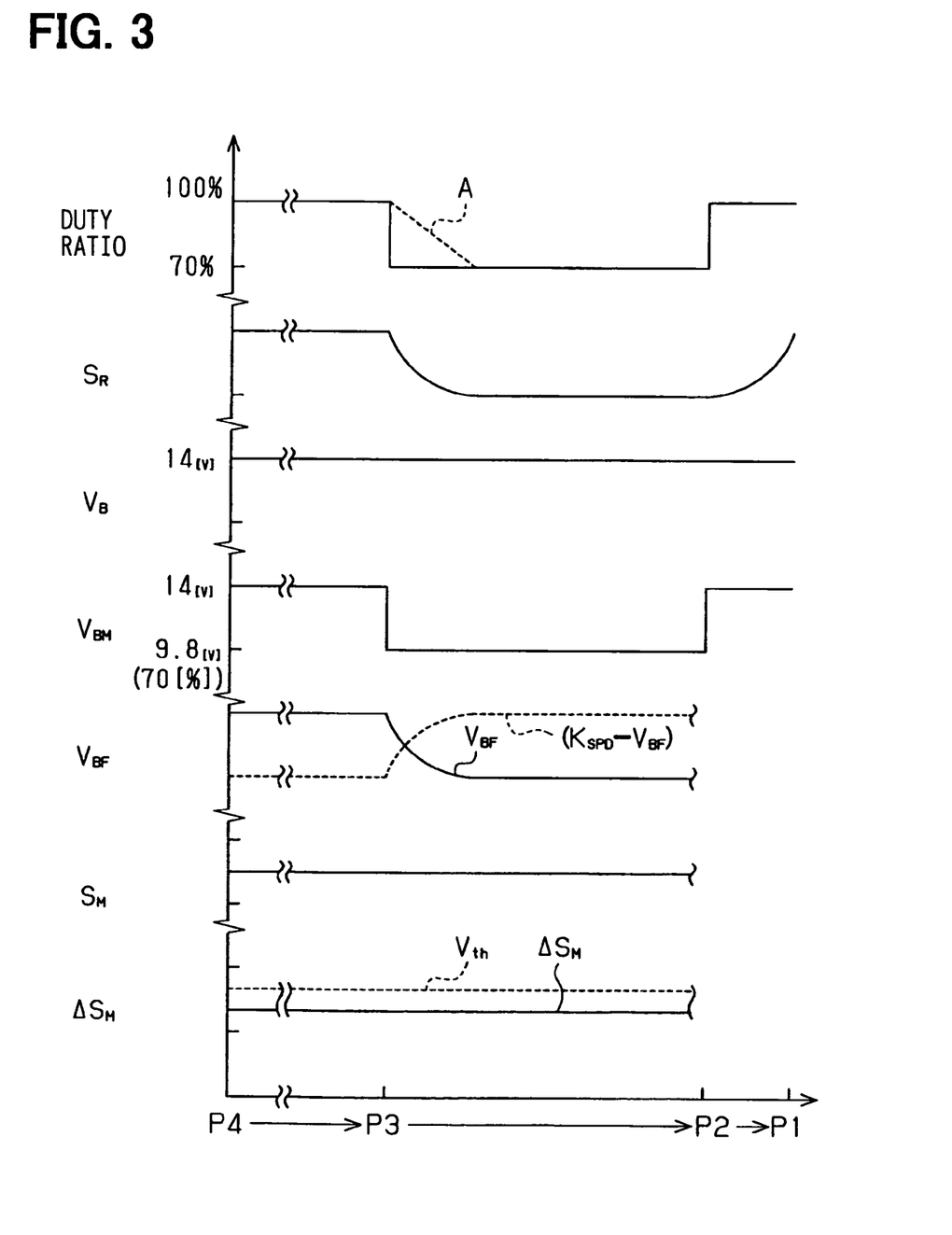
FIG. 3 is a chart showing relationships between the position of the window glass and values used for obstruction determination according to the first embodiment.

An actual rotation speed $S_R$ of the motor 2 varies according to the alteration of the duty ratio as shown in FIG. 3 when an obstruction is not present. When an obstruction is present, the actual rotation speed $S_R$ further decreases and a curve of the actual rotation speed $S_R$ will be drawn lower than the curve shown in FIG. 3. The controller 3 converts the motor driving voltage $V_{BM}$ to a correction voltage $V_{BF}$ that varies approximately in the same manner as the actual rotation speed $S_R$ by filtering (S4).

The controller 3 calculates a correction value that inversely varies with the correction voltage $V_{BF}$. The controller 3 subtracts the correction voltage $V_{BF}$ from a predetermined factor $K_{SPD}$ to calculate the correction value ($K_{SPD} - V_{BF}$). The controller 3 then adds the correction value to the actual rotation speed $S_R$ to calculate an object rotation speed $S_M$ (S5). The object rotation speed $S_M$ is a base of an object value that is compared with a threshold in the obstruction detection for determining whether an obstruction is present. The actual rotation speed $S_R$ is calculated in a different routine.

When an obstruction is not present, the object rotation speed $S_M$ is approximately constant. When an obstruction is present, a variation in the rotation speed caused by the obstruction is reflected in the object rotation speed $S_M$. Steps S1 through S5 are performed to reduce an effect of the amount of the reduction produced by the alteration of the duty ratio on the object rotation speed $S_M$. Since the object rotation speed $S_M$ is less likely to be affected by variations other than the amount of decrease caused by the obstruction, erroneous obstruction determination is reduced. A series of steps S1 through S5 is the process for reducing erroneous obstruction determination.

The controller 3 calculates a variation $\Delta S_M$ in the object rotation speed $S_M$ from a numbers (n) of object rotation speeds $S_M$ for the obstruction detection (S6). The variation $\Delta S_M$ is an object value that is compared with a threshold in the obstruction detection for determining whether an obstruction is present. The amount of the reduction caused by the alteration of the duty ratio is not reflected in the variation $\Delta S_M$ because it is not reflected in the rotation speed $S_M$. Therefore, the variation $\Delta S_M$ varies according to the variation in the rotation speed caused by an obstruction.

The controller 3 determines whether an obstruction is present based on a comparison between the variation $\Delta S_M$ and a predetermined threshold $V_{th}$ (S7). Because the amount of the reduction due to the alteration of the duty ratio is not reflected in the variation $\Delta S_M$, it is less likely to become a cause of the erroneous obstruction determination. The amount of the reduction caused by the obstruction is reflected in the variation $\Delta S_M$. As a result, the obstruction determination is accurately made based on the comparison between the variation $\Delta S_M$ and the threshold $V_{th}$.

When an obstruction is detected, the controller 3 sets an obstruction flag (S8). The controller 3 controls the motor 2 for releasing the obstruction based on the flag. When an obstruction is not detected, the controller 3 clears the flag (S9). The controller 3 repeats this obstruction detection process (steps S1 through S9) at the conclusion of a predetermined elapsed time.

This process also reduces erroneous obstruction determination due to a decrease in the battery voltage $V_B$. The actual rotation speed $S_R$ decreases as the battery voltage $V_B$ decreases. The decrease in the battery voltage $V_B$ is reflected in the motor driving voltage $V_{BM}$ and the correction voltage $V_{BF}$. However, the decrease is not reflected in the object rotation speed $S_M$ because it is corrected with the correction value ($K_{SPD} - V_{BF}$) that about inversely varies with the correction voltage $V_{BF}$. Thus, the amount of the reduction in the rotation speed due to the decrease in the battery voltage $V_B$ is not reflected in the object rotation speed $S_M$. The reduction in the actual rotation speed $S_R$ due to the decrease in the battery voltage $V_B$ is less likely to become a cause of the erroneous obstruction determination.

When the window glass 11 reaches a predetermined position (speed altering position P3) during the closing operation, the controller 3 reduces the rotation speed of the motor 2. The controller 3 determines that presence of an obstruction when the variation $\Delta S_M$ in the rotation speed exceeds the threshold $V_{th}$, and controls the motor 2 for releasing the obstruction.

The controller 3 corrects the variation $\Delta S_M$ by compensating for the amount of reduction in the rotation speed produced by rotation speed reducing operation. The variation $\Delta S_M$ used for the obstruction detection is mainly affected by the amount of decrease in the rotation speed caused by the obstruction. Variations in the rotation speed produced by other than the obstruction, including the motor 2, is less likely to be reflected in the variation $\Delta S_M$. As a result, the obstruction detection is accurately performed by comparing the variation $\Delta S_M$ with the threshold $V_{th}$.

The controller 3 corrects the variation $\Delta S_M$ by adding the correction value ($K_{SPD}-V_{BF}$) that inversely varies with variations in the rotation speed produced by rotation speed reducing operation. The variation $\Delta S_M$ is easily corrected through this addition.

The controller 3 controls the rotation speed of the motor 2 by altering the duty ratio of the driving power supplied by the battery 7. It calculates the correction voltage $V_{BF}$ from the battery voltage $V_B$ and the duty ratio. Then, it calculates the correction value ($K_{SPD}-V_{BF}$) based on the correction voltage $V_{BF}$. The rotation speed decreases relatively to decreases in the duty ratio. Therefore, the correction voltage $V_{BF}$ that varies approximately in the same manner as the variations in the rotation speed is easily calculated using the duty ratio. Namely, the correction value ($K_{SPD}-V_{BF}$) that inversely varies with the variations in the rotation speed is easily calculated.

Since the battery voltage $V_B$ is used for the calculation of the correction voltage $V_{BF}$, the variations in the battery voltage $V_B$ is reflected in the correction value ($K_{SPD}-V_{BF}$). Namely, the variations in the battery voltage $V_B$ is compensated and not reflected in the obstruction determination. As a result, the obstruction determination is accurately performed.

The controller 3 alters the rotation speed of the motor 2 back to the normal speed when the window glass 11 reaches the immediate position P2 during the closing operation. Torque of the motor 2 is increased for moving the window glass 11 from the immediate position P2 to the closed position P1. The window glass 11 receives a load from a whether strip (not shown) near the closed position P1. Therefore, a large amount of power is required to move the window glass 11 to the closed position P1. By increasing the torque of the motor 2 when the window glass 11 passes the immediate position P2, the window glass 11 is properly moved to the closed position P1.

[Second Embodiment]

An obstruction detection process, which is slightly different from that of the first embodiment, will be discussed referring to FIGS. 5 and 6. This process is also performed at predetermined periods during the closing operation of the window glass 11.

The he battery voltage VB, which is 14V (S11), is supplied from the battery 7 to the controller 3. It determines the duty ratio based on the position of the window glass 11 (S12). It sets the duty ratio at 100% for moving the window glass 11 from the open position P4 to the speed altering potion P3, and from the immediate position P2 to the close position P1. A direct current power is supplied to the motor 2 and the motor 2 rotates at the normal speed when the ratio is set at 100%. The controller 3 sets the duty ratio at 70% for moving the window glass 11 from the speed altering position P3 to the immediate position P2. Power having the duty ratio of 70% is supplied to the motor 2 and the motor 2 rotates at a low speed.

The controller 3 multiplies the battery voltage VB by the duty ratio to calculate a motor driving voltage $V_{BM}$ (S13). When the duty ratio is 100%, the motor driving voltage $V_{BM}$ is 14V. When the duty ratio is 70%, the motor driving voltage $V_{BM}$ is 9.8V.

Figure 5:
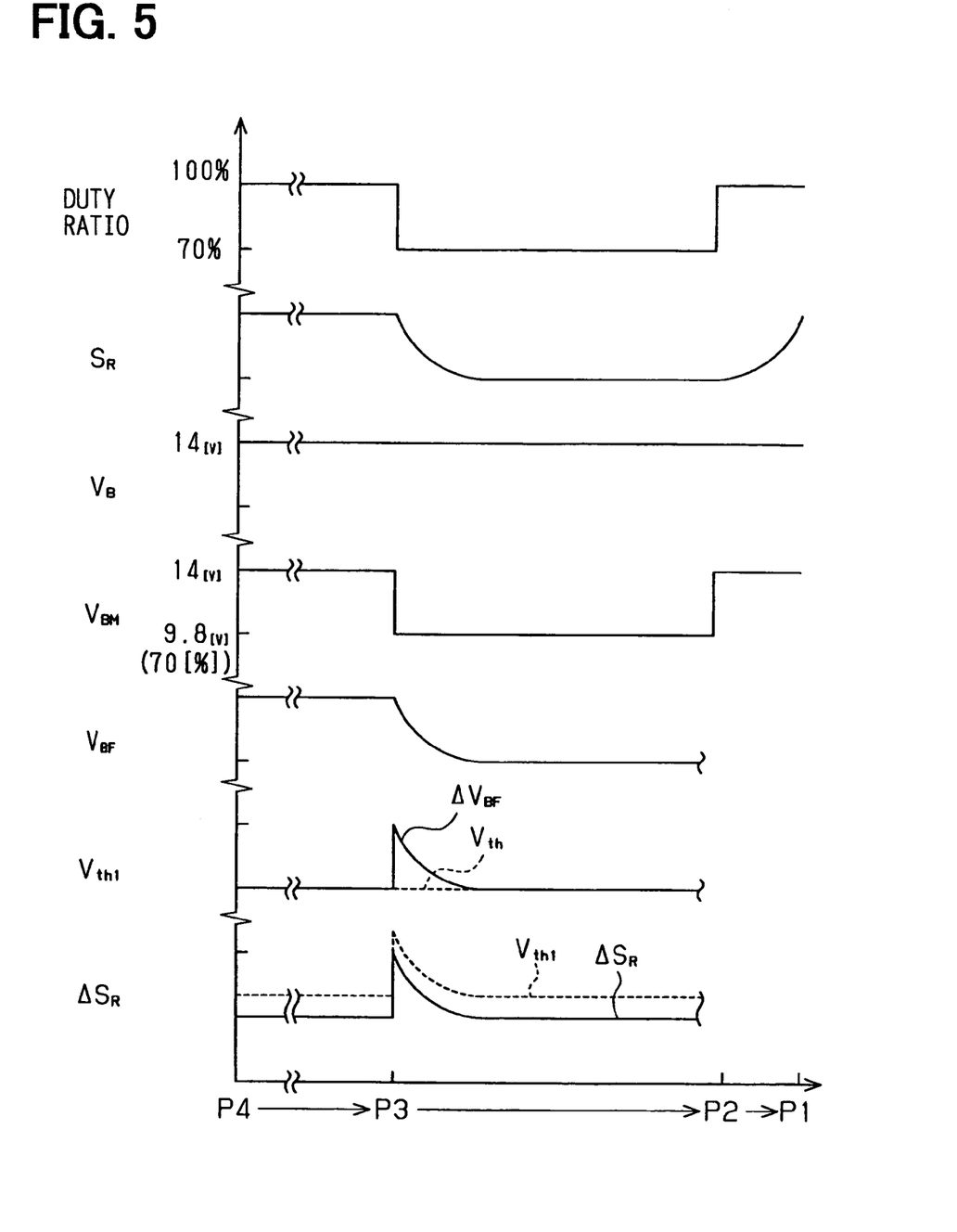
FIG. 5 is a chart showing relationships between the position of the window glass and values used for obstruction determination according to the second embodiment.
Figure 6:
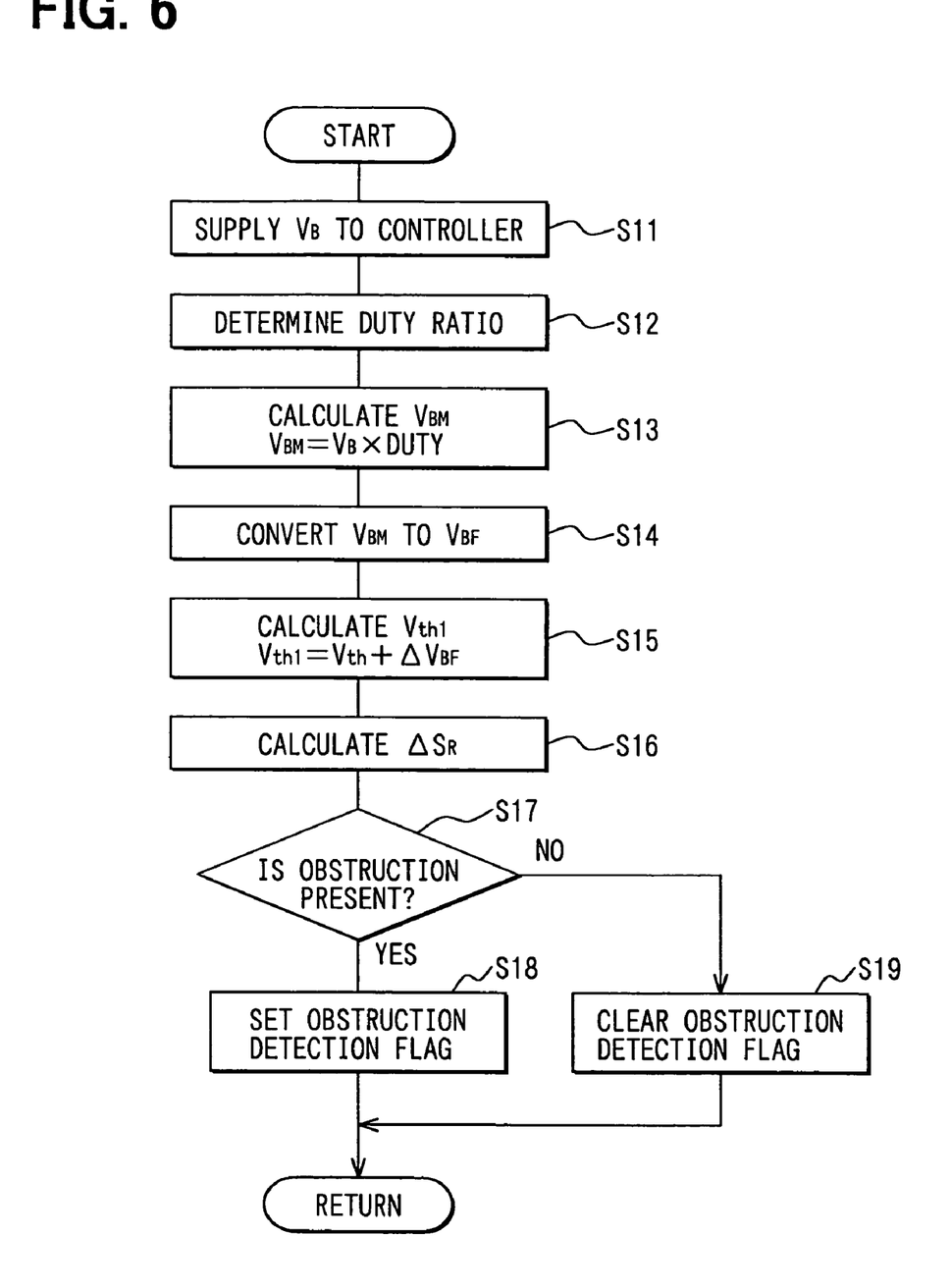
FIG. 6 is a flowchart of an obstruction determination process according to the second embodiment.

The actual rotation speed $S_R$ varies according to the alteration of the duty ratio as shown in FIG. 5 when an obstruction is not present. When an obstruction is present, the actual rotation speed further decreases and a curve of the actual rotation speed $S_R$ will be drawn lower than the curve shown in FIG. 5. The controller 3 converts the motor driving voltage $V_{BM}$ to a correction voltage $V_{BF}$ that varies approximately in the same manner as the actual rotation speed $S_R$ by filtering (S14).

The controller 3 calculates a determination threshold $V_{th1}$ (S15). In the calculation, the controller 3 calculates a derivative value $\Delta V_{BF}$ of the correction voltage $V_{BF}$ and adds the derivative value $\Delta V_{BF}$ to a predetermined threshold $V_{th}$, which is a base value. The determination threshold $V_{th1}$ is used for obstruction determination.

The derivative value $\Delta V_{BF}$ is a variation in the actual rotation speed $S_R$ produced by the alteration of the duty ratio under the condition that an obstruction is not present. The variation is reflected in the determination threshold $V_{th1}$ since the derivative value $\Delta V_{BF}$ is reflected in the determination threshold $V_{th1}$. Thus, erroneous determination due to the variation produced by the alteration of the duty ratio is reduced by using this determination threshold $V_{th1}$. A series of steps S11 through S15 is the process for reducing erroneous obstruction determination.

The controller 3 calculates a variation $\Delta S_R$ in the actual rotation speed $S_R$ for the obstruction detection using a number of the actual rotation speeds $S_R$ (S16). The actual rotation speeds $S_R$ are obtained in a different process.

The controller 3 determines whether an obstruction is present based on a comparison between the variation $\Delta S_M$ and the determination threshold $V_{th1}$ (S17). Because the variation due to the alteration of the duty ratio is reflected in the determination threshold $V_{th1}$, the variation is less likely to become a cause of the erroneous detection. The decrease in the rotation speed caused by the obstruction affects the variation $\Delta S_M$. As a result, the obstruction detection is accurately performed.

When an obstruction is detected, the controller 3 sets an obstruction flag (S18). The controller 3 controls the motor 2 for releasing the obstruction according to the flag, which is set. When an obstruction is not detected, the controller 3 clears the flag (S19). The controller 3 repeats this obstruction detection process (steps S11 through S19) at the conclusion of a predetermined elapsed time.

This process also reduces erroneous obstruction detection due to a decrease in the battery voltage $V_B$. The actual rotation speed $S_R$ decreases as the battery voltage $V_B$ decreases. The decrease in the battery voltage $V_B$ is reflected in the motor driving voltage $V_{BM}$ and the correction voltage $V_{BF}$. The derivative value $\Delta V_{BF}$ increases according to the decrease in the battery voltage $V_B$. Thus, the decrease in the rotation speed due to the decrease in the battery voltage $V_B$ is reflected in the determination threshold $V_{th1}$. The decrease in the rotation speed due to the decrease in the battery voltage $V_B$ is less likely to become a cause of the erroneous obstruction determination.

When the window glass 11 reaches a predetermined position (speed altering position P3) during the closing operation, the controller 3 reduces the rotation speed of the motor 2. The controller 3 determines that presence of an obstruction when the variation $\Delta S_M$ in the rotation speed exceeds the threshold $V_{th1}$, and controls the motor 2 for releasing the obstruction.

The controller 3 corrects the threshold $V_{th}$ to the determination threshold $V_{th1}$ based on the amount of reduction in the rotation speed produced by rotation speed reducing operation. Namely, the decrease in the rotation speed caused by the obstruction is mainly reflected in the rotation speed used for the obstruction determination. Thus, the obstruction determination is accurately performed. Furthermore, the determination threshold $V_{th1}$ is easily calculated through an addition of the derivative value $\Delta V_{BF}$ to the threshold $V_{th}$.

The controller 3 controls the rotation speed of the motor 2 by altering the duty ratio of the driving power supplied by the battery 7. It calculates the correction voltage $V_{BF}$ from the battery voltage $V_B$ and the duty ratio, and calculates the derivative value $\Delta V_{BF}$ based on the correction voltage $V_{BF}$. The amount of reduction in the rotation speed is relative to the variation in the duty ratio produced for altering the rotation speed the low speed. Therefore, the correction voltage $V_{BF}$ is easily calculated by using the duty ratio. The derivative value $\Delta V_{BF}$ is also easily calculated from the correction voltage $V_{BF}$.

Since the battery voltage $V_B$ is used for the calculation of the correction voltage $V_{BF}$, the variation in the battery voltage $V_B$ is reflected in the derivative value $\Delta V_{BF}$. The decrease in the rotation speed due to the decrease in the battery voltage $V_B$ is reflected in the obstruction determination. As a result, the obstruction detection is accurately performed.

Technical ideas derived from the embodiments will be discussed. A method for controlling opening and closing operations of the window glass 11 includes steps of reducing a rotation speed of the motor 2 during the closing operation, determining whether an obstruction is present, and controlling the motor 2 for releasing the obstruction. The obstruction determining step includes correcting the amount of decrease by compensating for the amount of reduction produced by through rotation speed reducing operation to reduce erroneous obstruction determination. The step further includes determining presence of an obstruction when the corrected amount of reduction exceeds a threshold $V_{th}$.

The compensation is made by adding a correction value to the amount of decrease in the rotation speed. The correction value reversely varies with the variation in the rotation speed produced by rotation speed reducing operation. The step further includes calculating a correction voltage $V_{BF}$ and calculating the correction value from the correction voltage $\Delta V_{BF}$. The correction voltage varies approximately in the same manner as the variation in the rotation speed produced by rotation speed reducing operation.

The rotation speed reducing step includes controlling the rotation speed through alteration of the duty ratio of driving power supplied to the motor 2. The correction voltage $\Delta V_{BF}$ is calculated from the battery voltage $V_B$ and the duty ratio.

The method further includes steps of detecting a position of the window glass 11 and altering the rotation speed according to the detected position. The rotation speed altering step includes altering the rotation speed when the detected position is equal to a predetermined position between the closed position P1 and the open position P4.

Another method includes an obstruction determination step different from the first method. Other steps included in this method are the same as the first method. The step includes correcting the threshold $V_{th}$ by compensating for the amount of reduction in the rotation speed produced by rotation speed reducing operation. The step further includes determining presence of an obstruction when the amount of decrease during the closing operation exceeds the corrected threshold $V_{th1}$. The compensation is made by adding a derivative value $\Delta V_{BF}$ of the amount of reduction to the threshold $V_{th}$.

The derivative value $\Delta V_{BF}$ is calculated based on the correction voltage $V_{BF}$ that varies approximately in the same manner as the variations in the rotation speed produced by rotation speed reducing operation. The correction voltage $V_{BF}$ is calculated from the battery voltage $V_B$ and the duty ratio when the reduction of the rotation speed is performed by the duty control.

These methods provide the same effects as the embodiments. Thus, the obstruction detection is accurately performed with these methods.

The present invention should not be limited to the embodiment previously discussed and shown in the figures, but may be implemented in various ways without departing from the spirit of the invention. For example, the duty ratio may be gradually decreased from 100% as a curve indicated by a dashed line A in FIG. 3. The duty ratio may be set at values other than 100% and 70% and can be altered according to positions different from the speed altering position P3 and the immediate position P2. The duty ratio may be altered more than twice.

The control of the rotation speed of the motor 2 is not limited to the duty control. When using a different type of control, the motor driving voltage $V_{BM}$ may be calculated by a different method. The present invention can be applied to other kinds of openable apparatus including a sunroof and a slide door.

What is claimed is:

1. An open-and-close control system for an openable apparatus driven by a drive motor, comprising
    a drive motor section having a drive motor for opening and closing an openable apparatus;
    an opening-and-closing operation command section that outputs a command signal for opening or closing operation of the openable apparatus;
    a drive motor control section that controls the drive motor for opening or closing the openable apparatus based on the opening or the closing operation command signal;
    a rotation speed detection section that detects a rotation speed of the drive motor;
    a rotation speed alteration section that alters the rotation speed during the closing operation of the openable apparatus; and
    an obstruction release control section that determines whether an obstruction is present in the openable apparatus during the closing operation and controls the drive motor for releasing the obstruction according to determination of the presence of the obstruction, wherein
    the obstruction release control section corrects a value related to the rotation speed during the closing operation by compensating for an amount of reduction in the rotation speed produced by rotation speed reducing operation of the rotation speed alteration section, and
    the obstruction release control section performs the obstruction determination based on the corrected value, wherein:
    the value is a rotation speed obtained during the closing operation; and
    the obstruction release control section corrects the obtained rotation speed by compensating for the amount of reduction in the rotation speed produced by the rotation speed reducing operation and performs the obstruction determination based on the corrected rotation speed.

2. The open-and-close control system according to claim 1, wherein:
    the obstruction release control section calculates a correction value that about inversely varies with a variation in the rotation speed produced by the rotation speed reducing operation; and the obstruction release control section corrects the obtained rotation speed by adding the correction value thereto.

3. The open-and-close control system according to claim 2, wherein:
the rotation speed alteration section performs duty control for controlling the rotation speed by altering a duty ratio of power supplied to the drive motor;
the obstruction release control section calculates a correction voltage that varies approximately in the same manner as the variation in the rotation speed produced by the rotation speed reducing operation from a voltage of the power and the duty ratio; and
the obstruction release control section calculates the correction value from the correction voltage.

4. An open-and-close control system for an openable apparatus driven by a drive motor, comprising
a drive motor section having a drive motor for opening and closing an openable apparatus;
an opening-and-closing operation command section that outputs a command signal for opening or closing operation of the openable apparatus;
a drive motor control section that controls the drive motor for opening or closing the openable apparatus based on the opening or the closing operation command signal;
a rotation speed detection section that detects a rotation speed of the drive motor;
a rotation speed alteration section that alters the rotation speed during the closing operation of the openable apparatus; and
an obstruction release control section that determines whether an obstruction is present in the openable apparatus during the closing operation and controls the drive motor for releasing the obstruction according to determination of the presence of the obstruction, wherein
the obstruction release control section corrects a value related to the rotation speed during the closing operation by compensating for an amount of reduction in the rotation speed produced by rotation speed reducing operation of the rotation speed alteration section,
the obstruction release control section performs the obstruction determination based on the corrected value,
the value is a predetermined threshold for the obstruction determination during the closing operation;
the obstruction release control section corrects the predetermined threshold by compensating for the amount of reduction in the rotation speed produced by the rotation speed reducing operation and performs the obstruction determination based on the corrected predetermined threshold,
the obstruction release control section calculates a correction value; and
the obstruction release control section corrects the predetermined threshold by adding the correction value thereto.

5. The open-and-close control system according to claim 4, wherein:
the rotation speed alteration section performs duty control for controlling the rotation speed by altering a duty ratio of power supplied to the drive motor;
the obstruction release control section calculates a correction voltage that varies approximately in the same manner as the variation in the rotation speed produced by the rotation speed reducing operation from a voltage of the power and the duty ratio; and
the obstruction release control section calculates the correction value from the correction voltage.

6. The open-and-close control system according to claim 5, wherein:
the correction value is a derivative value of the correction voltage; and
the obstruction release control section corrects the predetermined threshold by adding the derivative value thereto.

7. The open-and-close control system according to claim 1, further comprising a position detection section that detects a position of the openable apparatus from an open position to a closed position, wherein the rotation speed alteration section alters the rotation speed according to the position detected by the position detection section.

8. The open-and-close control system according to claim 7, wherein:
the position detection section detects an immediate position and a speed altering position that are predetermined at a position adjacent to the closed position and at a position away from the closed position with respect to the immediate position, respectively; and
the rotation speed alteration section alters the rotation speed at the speed altering position during the closing operation.

9. An open-and-close control system for an openable apparatus driven by a drive motor, comprising
a drive motor section having a drive motor for opening and closing an openable apparatus;
an opening-and-closing operation command section that outputs a command signal for opening or closing operation of the openable apparatus;
a drive motor control section that controls the drive motor for opening or closing the openable apparatus based on the opening or the closing operation command signal;
a rotation speed detection section that detects a rotation speed of the drive motor;
a rotation speed alteration section that alters the rotation speed by altering a duty ration of power supplied to the drive motor at a predetermined position during the closing operation of the openable apparatus; and
an obstruction release control section that determines whether an obstruction is present in the openable apparatus during the closing operation and controls the drive motor for releasing the obstruction according to determination of the presence of the obstruction, wherein
the obstruction release control section corrects a value related to the rotation speed based on the altered duty during the closing operation by compensating for an amount of reduction in the rotation speed produced by rotation speed reducing operation of the rotation speed alteration section, and
the obstruction release control section performs the obstruction determination based on the corrected value.

10. The open-and-close control system according to claim 9, wherein:
the value is a rotation speed obtained during the closing operation; and
the obstruction release control section corrects the obtained rotation speed by compensating for the amount of reduction in the rotation speed produced by the rotation speed reducing operation and performs the obstruction determination based on the corrected rotation speed.

11. The open-and-close control system according to claim 10, wherein:

the obstruction release control section calculates a correction value that about inversely varies with a variation in the rotation speed produced by the rotation speed reducing operation; and the obstruction release control section corrects the obtained rotation speed by adding the correction value thereto.

12. The open-and-close control system according to claim 11, wherein:

the obstruction release control section calculates a correction voltage that varies approximately in the same manner as the variation in the rotation speed produced by the rotation speed reducing operation from a voltage of the power and the duty ratio; and the obstruction release control section calculates the correction value from the correction voltage.

13. The open-and-close control system according to claim 9, wherein:

the value is a predetermined threshold for the obstruction determination during the closing operation; and the obstruction release control section corrects the predetermined threshold by compensating for the amount of reduction in the rotation speed produced by the rotation speed reducing operation and performs the obstruction determination based on the corrected predetermined threshold.

14. The open-and-close control system according to claim 13, wherein:

the obstruction release control section calculates a correction value; and the obstruction release control section corrects the predetermined threshold by adding the correction value thereto.

15. The open-and-close control system according to claim 14, wherein:

the obstruction release control section calculates a correction voltage that varies approximately in the same manner as the variation in the rotation speed produced by the rotation speed reducing operation from a voltage of the power and the duty ratio; and the obstruction release control section calculates the correction value from the correction voltage.

16. The open-and-close control system according to claim 15, wherein:

the correction value is a derivative value of the correction voltage; and the obstruction release control section corrects the predetermined threshold by adding the derivative value thereto.

17. The open-and-close control system according to claim 9, further comprising a position detection section that detects a position of the openable apparatus from an open position to a closed position, wherein the rotation speed alteration section alters the rotation speed according to the position detected by the position detection section.

18. The open-and-close control system according to claim 17, wherein:

the position detection section detects an immediate position and a speed altering position that are predetermined at a position adjacent to the closed position and at a position away from the closed position with respect to the immediate position, respectively; and the rotation speed alteration section alters the rotation speed at the speed altering position during the closing operation.

* * * * *